United States Patent
Piponi (10) Patent No.: US 8,948,927 B1
(45) Date of Patent: Feb. 3, 2015

(54) METHODS AND SYSTEMS FOR DETERMINING A DISTRIBUTION OF BALLOONS BASED ON POPULATION DENSITIES

(71) Applicant: Daniele P. Piponi, Oakland, CA (US)

(72) Inventor: Daniele P. Piponi, Oakland, CA (US)

(73) Assignee: Google Inc., Mountain View, CA (US)

( * ) Notice: Subject to any disclaimer, the term of this patent is extended or adjusted under 35 U.S.C. 154(b) by 25 days.

(21) Appl. No.: 13/727,708

(22) Filed: Dec. 27, 2012

(51) Int. Cl.
*G01C 21/00* (2006.01)
*G05D 1/00* (2006.01)

(52) U.S. Cl.
CPC .................................. *G05D 1/0027* (2013.01)
USPC ............................ 701/2; 342/352; 244/158.1

(58) Field of Classification Search
CPC ......... G01C 21/00; G01S 19/00; G01S 19/33; G01S 19/22; G05D 1/27
USPC ............. 701/2; 359/159; 342/352; 244/158.1
See application file for complete search history.

(56) References Cited

U.S. PATENT DOCUMENTS

| | | | |
|---|---|---|---|
| 6,167,263 A | 12/2000 | Campbell | |
| 6,324,398 B1 | 11/2001 | Lanzerotti et al. | |
| 6,402,090 B1 | 6/2002 | Aaron | |
| 6,437,743 B1 | 8/2002 | Mintz et al. | |
| 6,507,739 B1 | 1/2003 | Gross et al. | |
| 6,611,755 B1 | 8/2003 | Coffee et al. | |
| 6,628,941 B2 | 9/2003 | Knoblach et al. | |
| 6,678,520 B1 | 1/2004 | Wang | |
| 6,868,316 B1 * | 3/2005 | Stevens ........................... 701/13 |
| 7,046,934 B2 | 5/2006 | Badesh et al. | |
| 7,356,390 B2 | 4/2008 | Knoblach et al. | |
| 7,469,857 B2 | 12/2008 | Voss | |
| 7,512,462 B2 | 3/2009 | Nichols et al. | |
| 7,844,218 B2 | 11/2010 | Seligsohn et al. | |
| 7,946,533 B2 | 5/2011 | Goodzeit | |
| 8,116,763 B1 | 2/2012 | Olsen | |
| 8,238,903 B2 | 8/2012 | Korbet | |

(Continued)

FOREIGN PATENT DOCUMENTS

FR 2972697 9/2012

OTHER PUBLICATIONS

"Fleet management with automatic vehicle location", by Hamlen, M.D., published May 20-22, 1986 (Motorola Inc., Mobile Products Division).

(Continued)

*Primary Examiner* — Fadey Jabr
*Assistant Examiner* — Martin Weeks
(74) *Attorney, Agent, or Firm* — McDonnell Boehnen Hulbert & Berghoff LLP (57) ABSTRACT

Example methods and systems for determining a distribution of balloons based on population densities is provided. A method may include receiving information indicating a region divided into a plurality of horizontal bands of latitudes and a population density for one or more areas of the region. The method may also include associating the population density for a given area with a corresponding horizontal band of latitude in which the given area resides, and based on the population density associated with each horizontal band of latitude, determining a distribution of a plurality of balloons per horizontal band of latitude. The method may also include providing instructions to control the distribution of the plurality of balloons per horizontal band of latitude to remain in a trajectory substantially within a respective horizontal band of latitude.

19 Claims, 7 Drawing Sheets

(56) References Cited

U.S. PATENT DOCUMENTS

| | | |
|---|---|---|
| 8,260,485 B1 | 9/2012 | Meuth et al. |
| 8,275,499 B2 | 9/2012 | Coulmeau et al. |
| 2002/0077944 A1 | 6/2002 | Bly et al. |
| 2003/0040273 A1 | 2/2003 | Seligsohn et al. |
| 2006/0136126 A1* | 6/2006 | Coombes et al. ............ 701/208 |
| 2006/0167599 A1 | 7/2006 | Boden et al. |
| 2007/0288132 A1 | 12/2007 | Lam |
| 2008/0144884 A1 | 6/2008 | Habibi |
| 2009/0267740 A1 | 10/2009 | Pizzuto |
| 2011/0147513 A1 | 6/2011 | Surmont |
| 2012/0073682 A1 | 3/2012 | Geneste |
| 2012/0215505 A1 | 8/2012 | Srivastav |
| 2012/0256770 A1 | 10/2012 | Mitchell |

OTHER PUBLICATIONS

"A Mobile Location-Based Vehicle Fleet Management Service Application", by Silva, A.P., published Jun. 9-11, 2003, IEEE.

A method for Balloon Trajectory Control, by Aaron, K.M. et al., Global Aerospace Corporation, published Jun. 21, 2008.

Path Planning for Autonomous Underwater Vehicles in Realistic Oceanic Current Fields: Application to Gliders in the Western Mediterranean Sea, by Garau B. et al., Journal of Maritime Research, vol. VI. No. II, pp. 5-22, 2009.

Real-time Trajectory Design for Unmanned Aerial Vehicles using Receding Horizon Control, by Yoshiaki Kuwata, Thesis submitted to the MIT Department of Aeronautics and Astronautics, Jun. 2003.

Swarm Intelligence in autonomous collective robotics: from tools to the analysis and synthesis of distributed control strategies, Alcherio Martinoli, Thesis, 1999.

Autonomous Underwater Vehicle Path Planning: A Comparison of A* and Fast Marching Method, Kevin DeMarco, available at http://www.kevindemarco.com/wp-content/uploads/2011/05/fmm_paper_revised.pdf, 2011.

Optimal AUV path planning for extended missions in complex, fast-flowing estuarine environments, Dov Kruger et al., 2007 IEEE Conference on Robotics and Automation, Apr. 2007.

* cited by examiner

METHODS AND SYSTEMS FOR DETERMINING A DISTRIBUTION OF BALLOONS BASED ON POPULATION DENSITIES

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one example, a method is provided that comprises receiving information indicative of a region divided into a plurality of horizontal bands of latitudes and indicative of a population density for one or more areas of the region, and associating the population density for a given area with a corresponding horizontal band of latitude in which the given area resides. The method also includes based on the population density associated with each horizontal band of latitude, determining, by a processor, a distribution of a plurality of balloons per horizontal band of latitude, and providing, by the processor, instructions to control the distribution of the plurality of balloons per horizontal band of latitude to remain in a trajectory substantially within a respective horizontal band of latitude.

In another example, a computer readable storage medium having stored therein instructions, that when executed by a computing device, cause the computing device to perform functions is provided. The functions comprise dividing a region into a plurality of horizontal bands of latitudes, receiving information indicative of a population density for one or more areas of the region, and associating the population density for a given area with a corresponding horizontal band of latitude in which the given area resides. The functions also comprise based on the population density associated with each horizontal band of latitude, determining a distribution of a plurality of balloons per horizontal band of latitude, and providing instructions to control the distribution of the plurality of balloons per horizontal band of latitude to remain in a trajectory substantially within a respective horizontal band of latitude.

In still another example, a system is provided that comprises at least one processor, and data storage comprising program instructions executable by the at least one processor to cause the at least one processor to perform functions. The functions comprise receiving information indicative of a region divided into a plurality of horizontal bands of latitudes and indicative of a population density for one or more areas of the region, and associating the population density for a given area with a corresponding horizontal band of latitude in which the given area resides. The functions also comprise based on the population density associated with each horizontal band of latitude, determining a distribution of a plurality of balloons per horizontal band of latitude, and providing instructions to control the distribution of the plurality of balloons per horizontal band of latitude to remain in a trajectory substantially within a respective horizontal band of latitude.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples herein may be configured to provide a data network that includes a plurality of balloons (e.g., or other types of aerial vehicles), for example, a mesh network formed by high-altitude balloons deployed in the stratosphere. Since winds in the stratosphere may affect locations of the balloons in a differential manner, each balloon in an example network may be configured to change its horizontal position by adjusting its vertical position (i.e., altitude). For example, by adjusting its altitude, a balloon may be able find winds that will carry the balloon horizontally (e.g., latitudinally and/or longitudinally) to a desired horizontal location.

Within example, methods and systems for determining a distribution of balloons based on population densities are provided. A method may include receiving information indicating a region divided into a plurality of horizontal bands of latitudes and a population density for one or more areas of the region. The method may also include associating the population density for a given area with a corresponding horizontal band of latitude in which the given area resides, and based on the population density associated with each horizontal band of latitude, determining a distribution of a plurality of balloons per horizontal band of latitude. The method may also include providing instructions to control the distribution of the plurality of balloons per horizontal band of latitude to remain in a trajectory substantially within a respective horizontal band of latitude.

Figure 1:
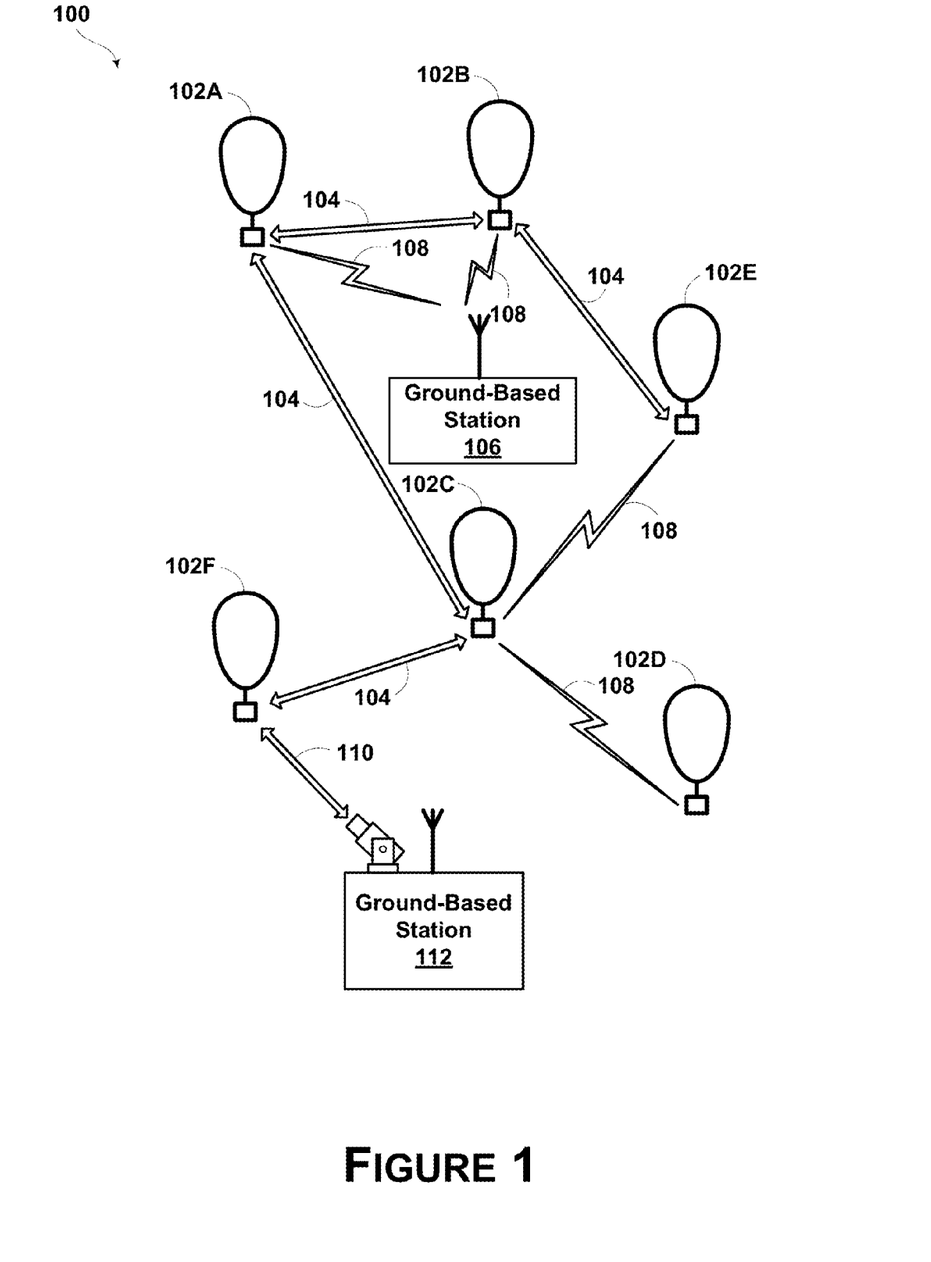
FIG. 1 is a block diagram illustrating an example balloon network.

FIG. 1 is a block diagram illustrating an example balloon network 100. As shown, the balloon network 100 includes balloons 102A to 102F, which are configured to communicate with one another via free-space optical links 104. Configured as such, balloons 102A to 102F may collectively function as a mesh network for packet-data communications. Further, at least some of balloons 102A and 102B may be configured for RF communications with ground-based stations 106 via respective RF links 108. Yet further, some balloons, such as balloon 102F, may be configured to communicate via optical link 110 with ground-based station 112.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has relatively low wind-speeds (e.g., between 5 and 20 miles per hour (mph)).

More specifically, in a high-altitude-balloon network, balloons 102A to 102F may generally be configured to operate at altitudes between 18 km and 25 km (although other altitudes are possible). At such altitudes, for example, the layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers.

In a further aspect, balloons 102A to 102F may utilize one or more of various different RF air-interface protocols for communication with ground-based stations 106 via respective RF links 108. For instance, some or all of balloons 102A to 102F may be configured to communicate with ground-based station 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect in balloon network 100, balloon 102F is configured as a downlink balloon to provide a high-capacity air-ground link. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and ground-based station 112.

Note that in some implementations, a downlink balloon 102F may additionally be operable for RF communication with ground-based station 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104.

Ground-based stations, such as ground-based station 106 and/or 112, may include components such as transceivers, transmitters, and/or receivers for communication via RF links and/or optical links with a balloon network. Further, a ground-based station may use various air-interface protocols in order to communicate with a balloon 102A to 102F over an RF link. As such, a ground-based station 106 may be configured as an access point via which various devices can connect to balloon network 100.

In a further aspect, some or all balloons 102A to 102F could be configured to establish a communication link with space-based satellites in addition to, or as an alternative to, a ground-based communication link. In some embodiments, a balloon may communicate with a satellite via an optical link.

Further, some ground-based stations, such as ground-based station 106, may be configured as gateways between balloon network 100 and one or more other networks. Such a ground-based station 106 may thus serve as an interface between the balloon network and the Internet, a cellular service provider's network, and/or other types of networks.

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to the balloon and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. For instance, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, the same wavelength can be assigned for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

In some examples, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

Figure 2:
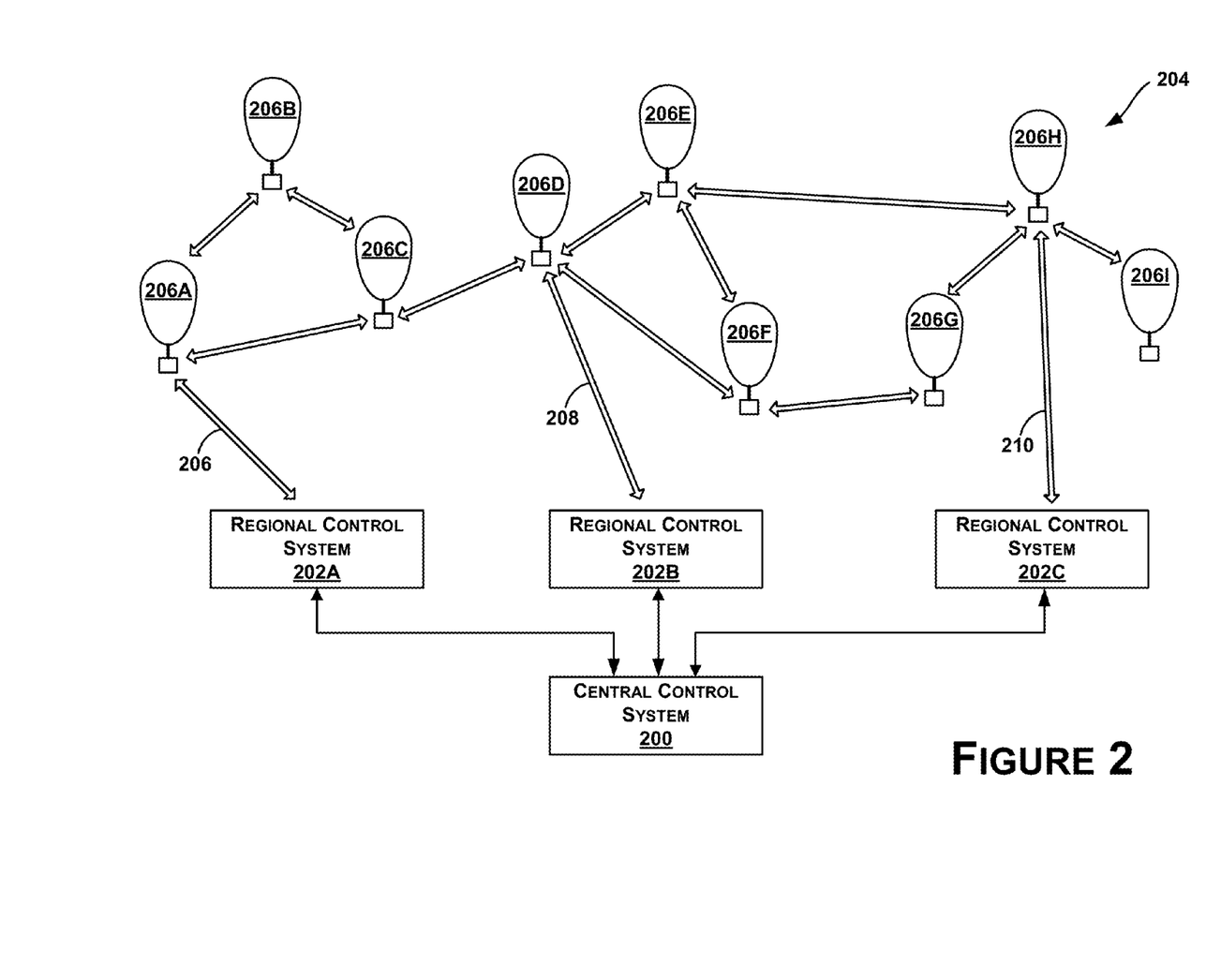
FIG. 2 is a block diagram illustrating an example balloon-network control system.

FIG. 2 is a block diagram illustrating an example balloon-network control system. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that the balloons cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206D, and 206H are configured as downlink balloons. As such, regional control systems 202A to 202C may respectively communicate with balloons 206A, 206D, and 206H via optical links 206, 208, and 210, respectively.

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Figure 3:
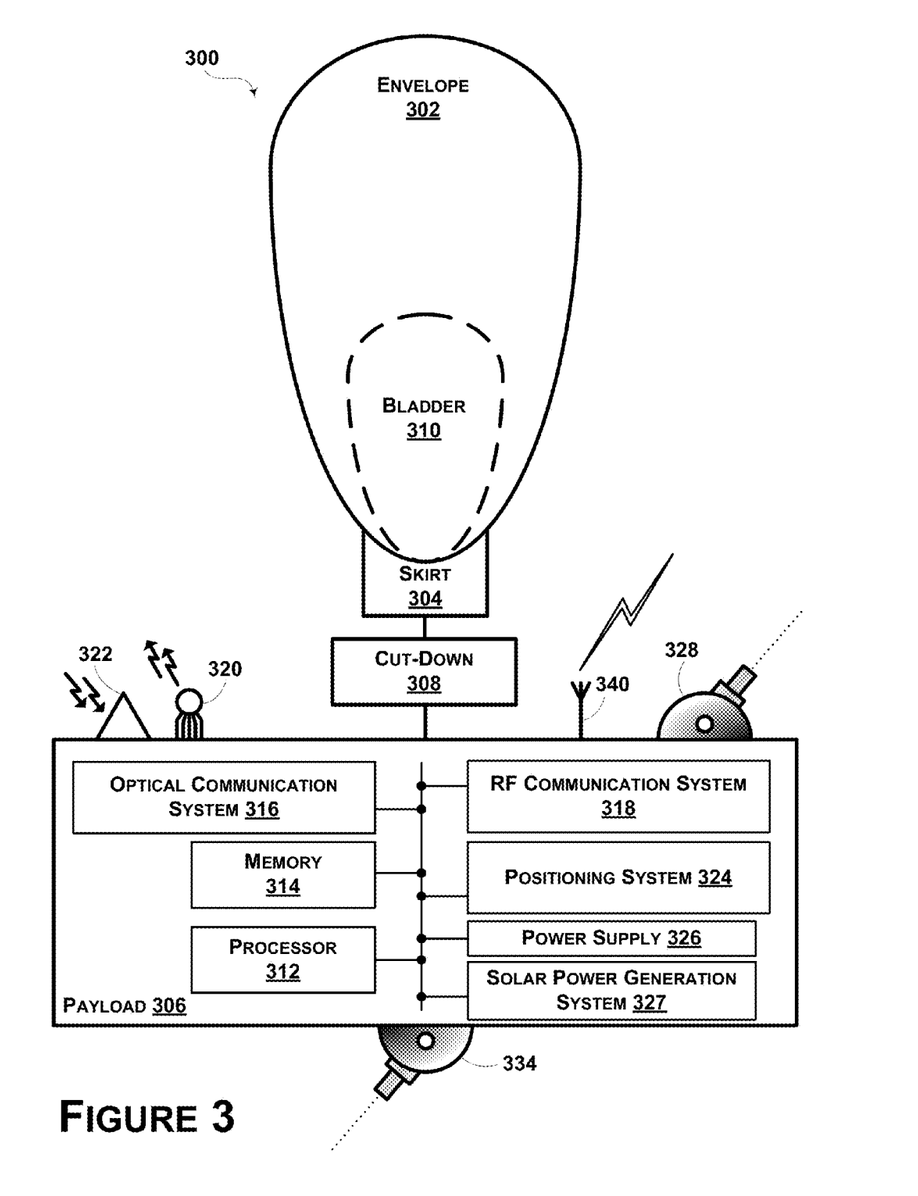
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 18 km and 25 km. FIG. 3 shows a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, for instance, the envelope 302 and/or skirt 304 may be made of metalized Mylar or BoPet. Alternatively or additionally, some or all of the envelope 302 and/or skirt 304 may be constructed from a highly-flexible latex material or a rubber material such as chloroprene. Further, the shape and size of the envelope 302 and skirt 304 may vary depending upon the particular implementation. Additionally, the envelope 302 may be filled with various different types of gases, such as helium and/or hydrogen.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 340. The payload 306 may further include a positioning system 324 that can include a GPS or other location-based sensors.

The payload 306 may also include a power supply 326 to supply power to the various components of balloon 300. The power supply 326 may include or take the form of a rechargeable battery. In addition, the balloon 300 may include a solar power generation system 327. The solar power generation system 327 may include solar panels and could be used to generate power that charges and/or is distributed by the power supply 326.

Further, payload 306 may include various types of other systems 328 and sensors 334. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an exemplary embodiment, the cut-down system 308 may include a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302. Other types of cut-down systems and/or variations on the illustrated cut-down system 308 are possible as well.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground. In yet other embodiments, balloons may be serviced in-flight by specific service balloons or another type of service aerostat or service aircraft.

As described, movement and locations of balloons can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able find winds that will carry the balloon horizontally (e.g., latitudinally and/or longitudinally) to a desired horizontal location. Wind speed varies with altitude, and since current wind speeds as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

In some example configurations, a latitude position of a balloon may be maintained more easily than a longitude due to an east or west wind at some altitude providing a stream of air along a line of latitude or along paths that slowly vary in latitude. Balloons may be controlled so as to be maintained within a band following lines of latitude around the Earth. In such examples, for planning purposes, the Earth can be divided into bands of latitudes and without knowledge of wind information from hour to hour, balloons can be maintained within a given band due to general east-to-west or west-to-east winds.

A distribution of balloons may be maintained over the surface of the Earth so as to maximize some quantity. In one example, balloons may be controlled based on a population density across the Earth so that there are more balloons where the population is greater. In one example, if balloons move from east to west, balloons can be placed within a latitude band that covers a large city, and as balloons traverse around the Earth, the balloons will continually cover the large city over time. The self-repeating weather phenomenon of wind direction can guide the balloons to remain in trajectories or cyclical trajectories. There may be some north or south wind, and thus, a band of latitude can have some thickness to enable variation within the band.

In other examples, balloons may be controlled based on other variables, such as being present over areas with little to no data communication access or being present over areas to provide Internet access to a maximum number of people. Due to continual winds, balloons will not remain over one location, but rather will move along a path. In some examples, balloons may initially cluster around a city, and then an hour later the cluster may likely progress east or west of the city unless more balloons are scheduled to enter from the west or east. The distribution may be a fixed distribution or can adapt to demands, e.g., newly appearing demand or Internet connectivity at special events (e.g., concerts, sporting events, etc.).

Figure 4:
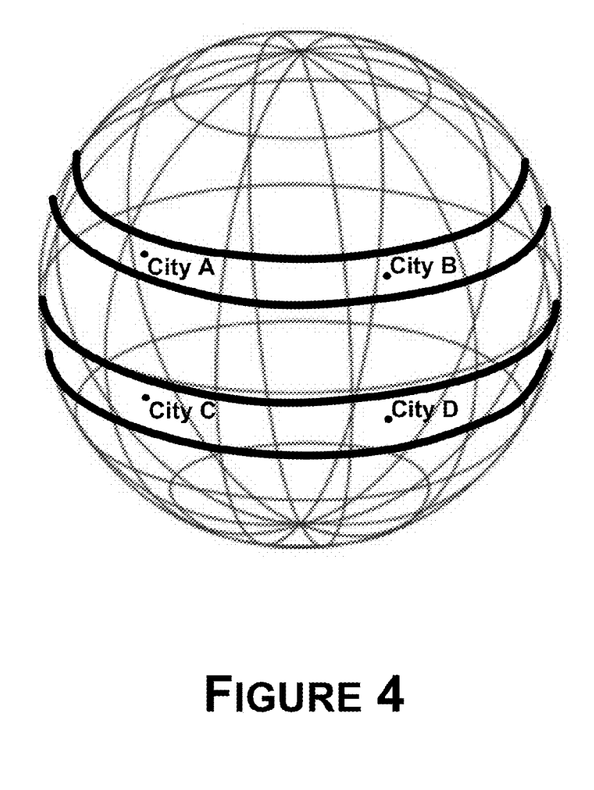
FIG. 4 is a conceptual illustration of the Earth and example latitude bands of the Earth.

FIG. 4 is a conceptual illustration of the Earth and example latitude bands of the Earth. In some examples, a distribution of balloons may be maintained rather than maintaining a location of any one balloon, and the distribution may be provided in a non-uniform manner. An area (e.g., the Earth or smaller regions of the Earth) may be divided into latitude bands, as shown in FIG. 4, and balloons may be controlled to be in a uniform density at or within each individual latitude band. However, fleet densities may be varied per latitude bands. In one example, a first latitude band may include areas in which city A and city B reside, and a second latitude band may include areas in which city C and city D reside. Bands of latitudes in which to provide balloons can be selected based on population densities of areas in the bands.

Figure 5:
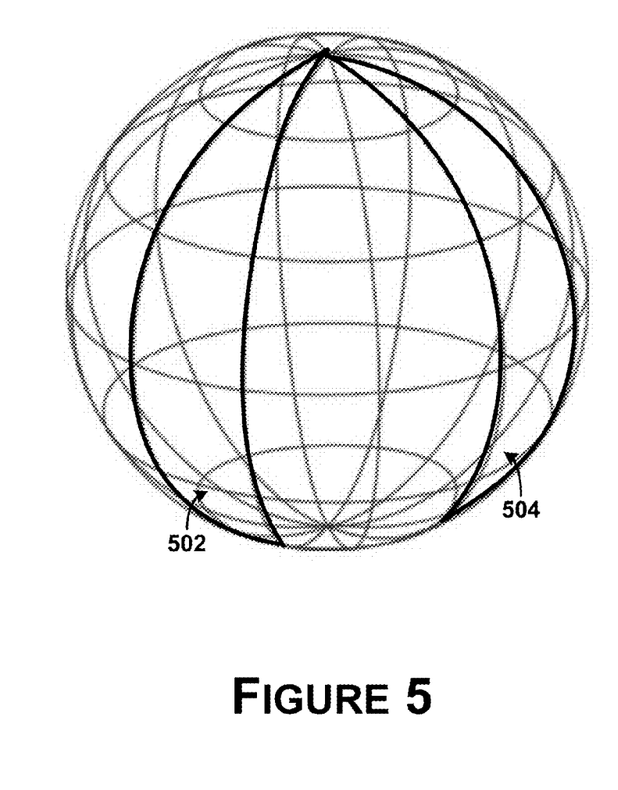
FIG. 5 illustrates a conceptual illustration of the Earth and example bands of longitude.

In addition, columns or bands of longitudes of a distribution of balloons may be scaled so that each column has about a same number of balloons. FIG. 5 illustrates a conceptual illustration of the Earth and example bands of longitude. Balloons may be controlled so as to be maintained within a given band of latitude (as shown in FIG. 4), and such that a density of the balloons within the given band of latitude is substantially uniform per band of longitude 502 and 504 (as shown in FIG. 5). Thus, as balloons drift from east to west or west to east, the balloons can be configured to move from one distribution to another similar distribution. Over time, balloons may be controlled to drift north and south to cover population centers, and distributions may be configured to maintain fewer balloons along lines of latitude with lower populations.

Figure 6:
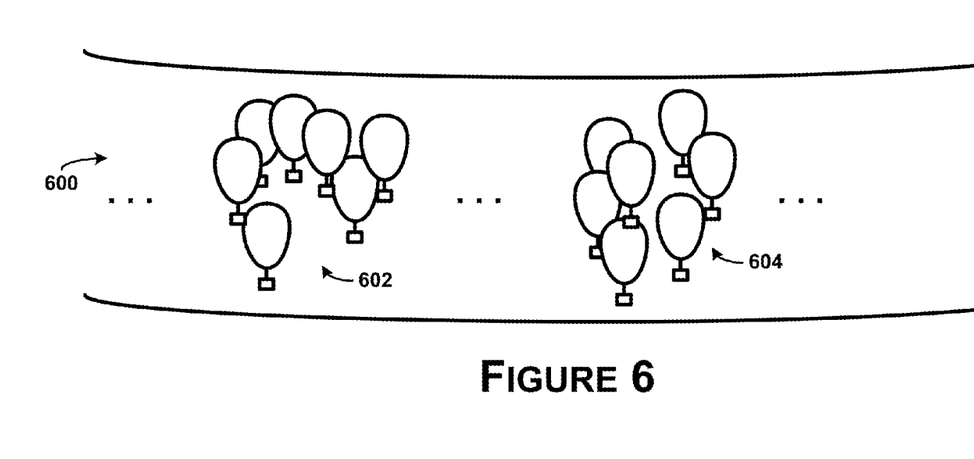
FIG. 6 is a conceptual illustration of another example distribution of balloons.

FIG. 6 is a conceptual illustration of another example distribution of balloons. In FIG. 6, a band of latitude 600 is shown with a given distribution of a number of balloons in two separate clusters of balloons 602 and 604. Any amount of distance may be between the two clusters of balloons 602 and 604 as needed to meet a coverage requirement. In addition, the clusters of balloons 602 and 604 may include any number of balloons to meet the coverage requirement.

Figure 7:
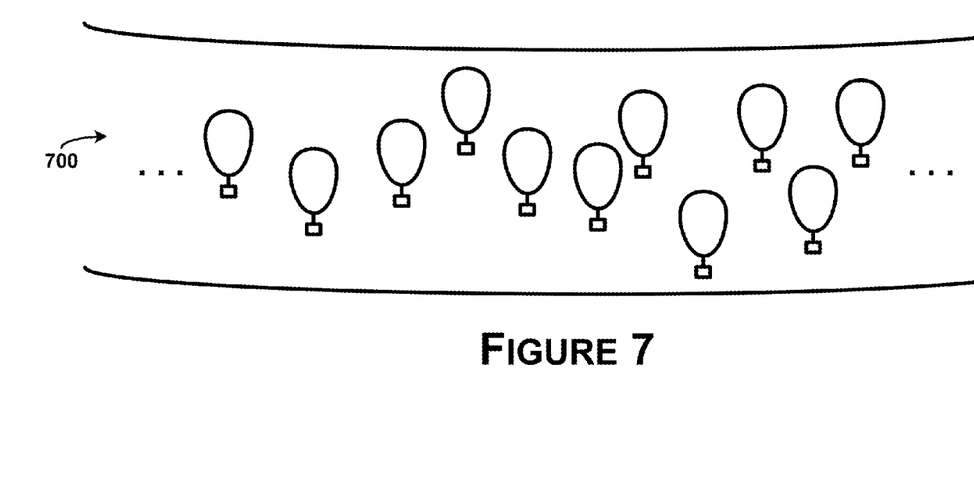
FIG. 7 is another conceptual illustration of another example distribution of balloons.

FIG. 7 is another conceptual illustration of another example distribution of balloons. In FIG. 7, a band of latitude 700 is shown with a given distribution of a number of balloons that are substantially evenly (or uniformly) distributed throughout the band of latitude 700. In some instances, distributions of balloons may be blurred in the horizontal direction. More specifically, a distribution of balloons may be convolved with a spatially varying filter that has a shape reflecting an average achievability of navigation from point A to point B.

Figure 8:
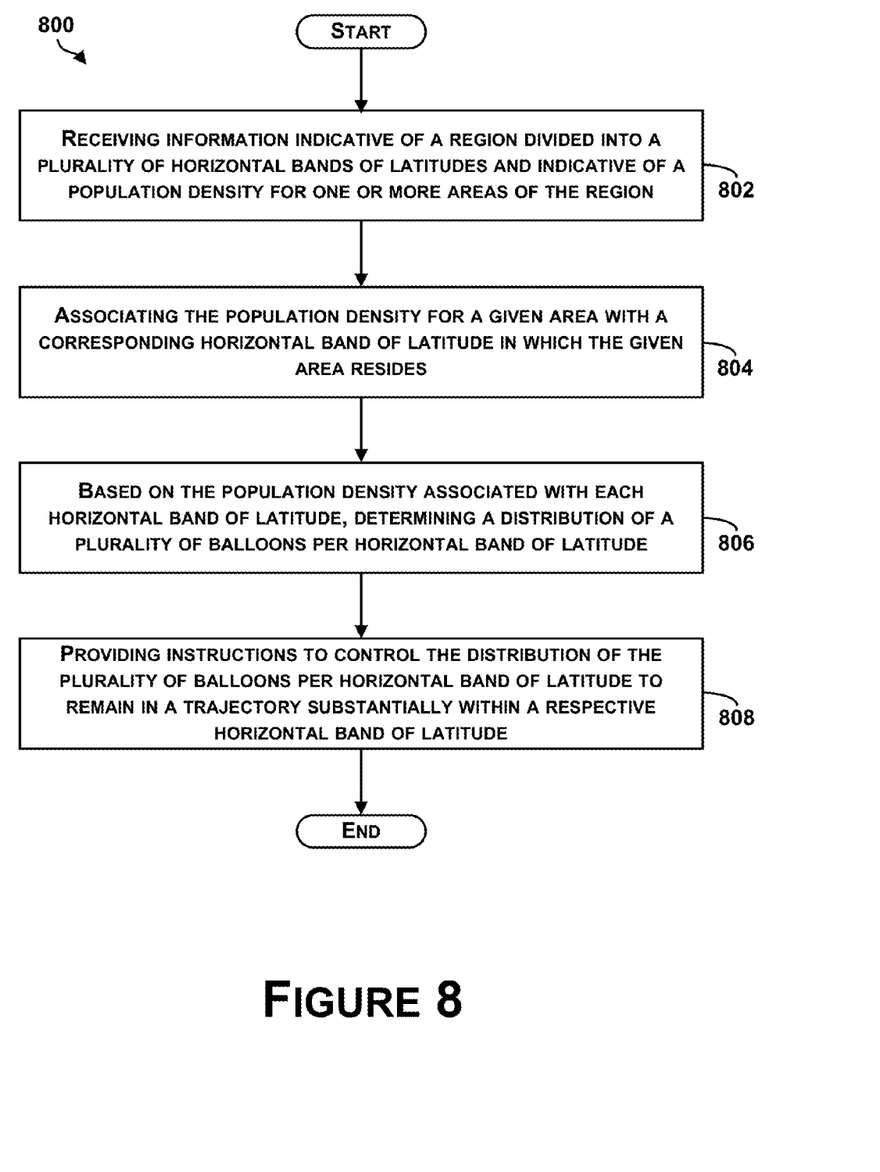
FIG. 8 is an example block diagram of a method to determine a distribution of balloons based on population densities, in accordance with at least some embodiments described herein.

FIG. 8 is an example block diagram of a method to determine a distribution of balloons based on population densities, in accordance with at least some embodiments described herein. Method 800 shown in FIG. 8 presents an embodiment of a method that, for example, could be used with the balloon networks 100 and 204, for example, and may be performed by a device, a server, a control station, a balloon, or a combination of any components of the balloon networks 100 and 204. Method 800 may include one or more operations, functions, or actions as illustrated by one or more of blocks 802-808. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 800 and other processes and methods disclosed herein, each block in FIG. 8 may represent circuitry that is wired to perform the specific logical functions in the process.

At block 802, the method 800 includes receiving information indicative of a region divided into a plurality of horizontal bands of latitudes and indicative of a population density for one or more areas of the region. A processor may receive the information from a server or portions of the information from balloons deployed in the network. In some examples, a horizontal band of latitude may have a thickness based on northern and southern wind bands present at the latitudes. If a given wind pattern is generally the same or constant over a number of adjacent lines of latitude, the adjacent lines of latitude may be combined into a band of latitude, for example.

At block 804, the method 800 includes associating the population density for a given area with a corresponding horizontal band of latitude in which the given area resides. In some examples, the method 800 may include receiving information about the region, and dividing the region into the plurality of horizontal bands of latitudes based on the population density for the given area with the corresponding horizontal band of latitude in which the given area resides. In some examples, the Earth (or regions of the Earth) may be divided into a number of bands of latitudes such that each band includes an equal number of latitude segments (e.g., every band includes a range of about 10-20° of latitude). In other examples, populations of regions can be determined and associated with a band of latitude in which the region resides, and for adjacent bands of latitude having associated populations above a threshold, such bands can be combined to form a combined band of latitude.

The region may be divided into horizontal bands of latitude in any number of ways depending on an amount of balloons available for distribution. For densely populated regions, bands of latitude may be divided in a manner to be more narrow so as to distribute more balloons over the populated areas. For sparsely populated regions, bands of latitude may be divided in a manner to be more broad/wide so as to distribute balloons over a larger area.

Each band of latitude may include an identifier that indicates the population density associated with the band of latitude. The identifier may indicate a value of the population, or may be tied to a number of balloons needed to serve the population, for example.

At block 806, the method includes, based on the population density associated with each horizontal band of latitude, determining, by a processor, a distribution of a plurality of balloons per horizontal band of latitude. The distribution may be determined so as to provide more balloons to areas of higher population. In some examples, distributions may be varied per horizontal band of latitude so as to provide a range of coverage across the Earth. In other examples, distributions may be based on an amount of data communication access provided for given areas residing in the horizontal band of latitude due to the population of the areas. A population or population density may change over time, or even temporarily such as due to a spike in population for a sporting event or concert, and adjustments to the distribution can be determined based on a change in the population density of a given area.

In other examples, distributions may be determined so that the balloons have a substantially uniform density per a given band of longitude in addition to per a given band of latitude. In examples, the distribution of balloons may be provided in one or more clusters of balloons based on bands of longitude (as shown in FIG. 6), or generally uniform based on bands of longitude (as shown in FIG. 7).

Distributions of balloons may be assigned to respective horizontal bands of latitudes from among any number of horizontal bands of latitudes. In contrast, distributions of balloons may be assigned to avoid certain respective horizontal bands of latitudes. In such examples, bands of latitudes at which to provide balloons to operate can be selected from among sets of bands. For instance, areas from among all areas of the region that have similar associated population density values can be grouped, and from those, areas that lie within a respective horizontal band of latitude of a thickness within a threshold amount can be selected (e.g., areas that are close in geographic location). A distribution of balloons can be assigned to operate in the respective horizontal band of latitude. The threshold amount may be any amount, such as about 5°, 10°, 15°, 30°, etc., or may be a range of amounts such as about 5°-10°, 15°-25°, etc.

At block 808, the method 800 includes providing, by the processor, instructions to control the distribution of the plurality of balloons per horizontal band of latitude to remain in a trajectory substantially within a respective horizontal band of latitude. The instructions can be provided by a ground-based station to the balloons. In examples in which the method 800 or portions of the method 800 are performed by the balloon, instructions can be provided to control components of the balloon.

The instructions may include information indicating one or more altitudes for the distribution of the plurality of balloons to travel, per horizontal band of latitude, so as to remain in the trajectory substantially within the respective horizontal band of latitude. For example, at certain altitudes, constant or substantially constant winds may be present. Thus, remaining at a constant altitude can propel the balloon along a constant trajectory. In other examples, a balloon may travel at a different altitude depending on the longitudinal position of the balloon within a horizontal band of latitude.

The trajectory may include a path of the band of latitude. Over time, due to wind direction and speed, the balloons will travel around the world and can do so in a manner so as to continually travel along the band of latitude until being cut-down, or otherwise controlled. The trajectory may be substantially cyclical, and in some instances, to be cyclically controlled includes following a band or line of latitude. A balloon may not travel around the world entirely, in some instances, or may be cut-down and re-launched to do so.

In some examples, the method 800 includes determining the instructions to control the distribution of balloons per horizontal band of latitude based on a self-repeating weather phenomenon of the region. The self-repeating phenomenon may include wind speeds, wind directions, and other weather patterns.

Figure 9:
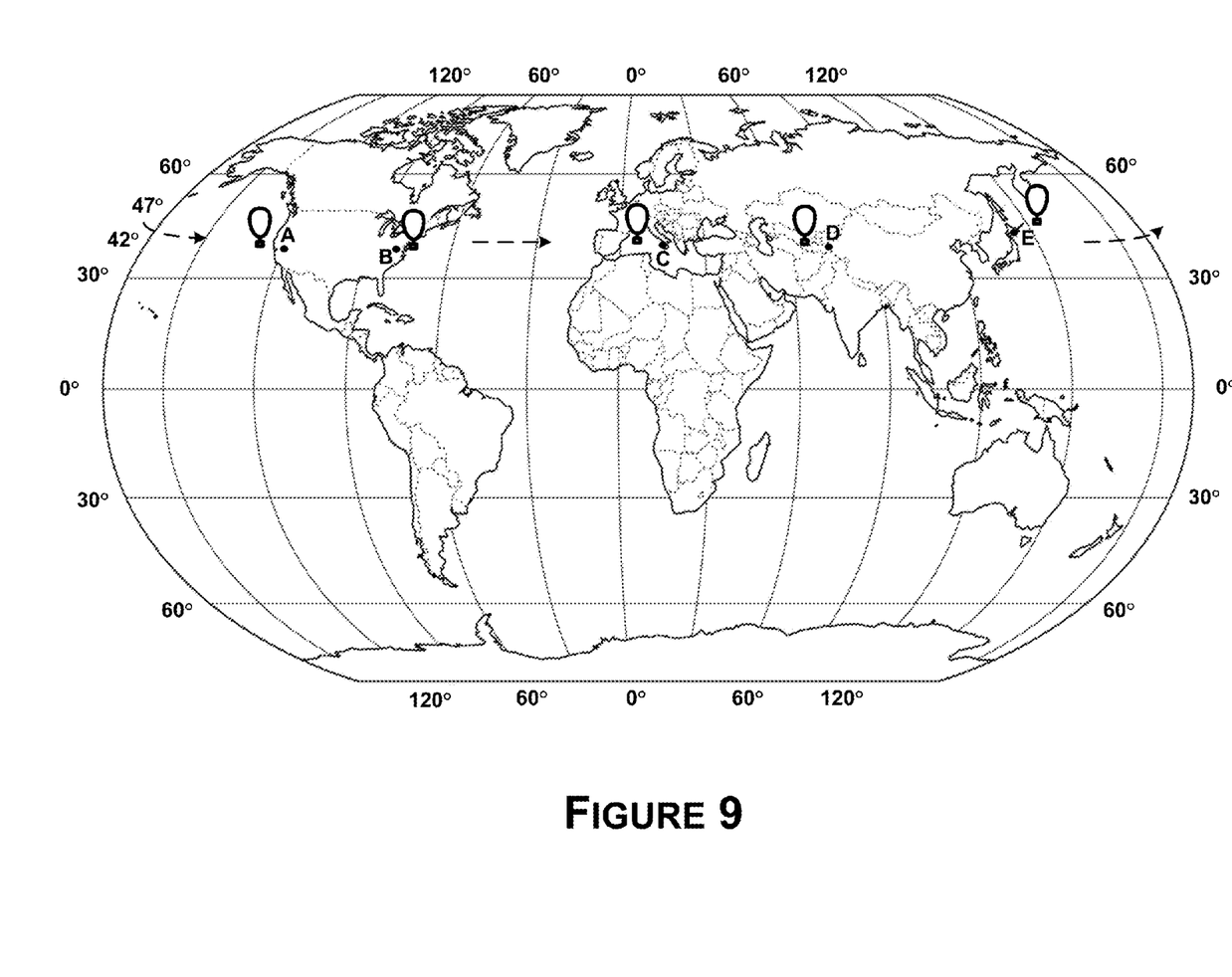
FIG. 9 is a conceptual illustration of the Earth showing a trajectory for balloons to travel.

FIG. 9 is a conceptual illustration of the Earth showing a trajectory for balloons to travel. In FIG. 9, balloons are shown to travel within a band of latitude between 42° and 47°. In FIG. 9, although only one balloon is illustrated in a given location, the balloon may represent a number of balloons, a cluster of balloons, or other balloons may be present and not shown. In this example, population densities at locations A through E may be such that by providing balloons along this band of latitude, a number of people can receive coverage. In addition, by providing the balloons in the band of latitude, as the balloons travel around the Earth, the balloons will travel through areas including locations A through E. If locations A through E have a population above a threshold amount, then the balloons can be utilized in an optimal manner to provide a largest amount of coverage to a largest amount of people.

Bands of latitude at which to operate balloons can be selected based on the bands having a population density above a threshold amount. The threshold amount may be any number, and can be based on an amount of balloons in the fleet. For fewer balloons, the population may be set higher.

To select bands of latitude at which to operate balloons, initially, populations of areas within the bands of latitude can be determined, and for those bands that have an aggregate population above a threshold or a number of cities that have a population above a threshold, balloons may be provided. Thus, as shown in FIG. 9, the band of latitudes between 42°-47° has locations A through E, and each location may have a population satisfying requirements to have balloons distributed therein. Or, it could be that an aggregate of the population of locations A through E has a population satisfying the requirement. In such examples, details of both which bands of latitude to select for providing balloons as well as a distribution of balloons per band of latitude can be based on population densities of the area.

Within examples, instructions can be provided to control the distribution of the plurality of balloons per horizontal band of latitude to be or remain in a trajectory within a respective horizontal band of latitude. In some examples, the instructions may include an altitude at which to fly the balloon to be carried along a trajectory of a wind.

In other examples, instructions may be more complex, and may include details of various altitudes at which to fly the balloons at various time increments or other information determined as a result of fleet planning Within examples, for a balloon trajectory from location A to location C, it is possible that there may be a wind at some altitude that could take a balloon from location A to location B, and wind at another altitude that could take the balloon from location B to location C. Thus, to traverse from location A to location C, an intermediate location B is needed. In other examples, to traverse from location A to location C may require passing from location A to location B1 to location B2 to location B3 and so on until arriving at location C. A number of possibilities grow with a number of "way-points" along a path. To control a fleet of balloons, a simultaneous plan of trajectory for many balloons at many starting locations may be needed, and each balloon may take a different path.

Within examples, a system may be configured to receive (or determine) a starting location of each balloon of a fleet of balloons and receive a sequence of coverage requirements for the region for a planning time period and providing instructions to the balloons accordingly. As an example, the sequence of coverage requirements for the time period may specify a goal number of balloons for each of a plurality of landmarks within the region at various times T during the time period. The system may also be configured to divide the time period into phases based on distinct values of T in the sequence of coverage requirements: a first phase may be defined from a starting time of the time period to an earliest T;

a second phase may be defined between the end of the first phase and a second earliest T, etc. Additionally, a set of landmarks may be associated with the start and end of each phase: the start of the first phase may use the initial location of each of the balloons as landmarks; the end of the first phase and the start of the second phase may share the set of landmarks associated with the earliest T, etc.

Based on the received information, the system may be further configured to determine trajectories that satisfy the sequence of coverage requirements for the region. To determine the trajectories, the system may initially establish possible routes for balloons within each phase. For each landmark at the start of a phase and for each landmark at the end of the phase, the system may determine how close to the end-of-phase landmark that a balloon starting from the start-of-phase landmark could get by traveling during the phase. Example trajectories may be determined based on estimated or predicted wind conditions at one or more altitudes.

In one example, a backward planner may be used to determine a measure of how close to a target location that a balloon could reach if the balloon was starting at another location within a region. For example, given a target time and target location as well as an initial time, the backward planner may be configured to determine, for a grid of starting locations within a region, a measure of how close to the target location a balloon could get, if the balloon was flying from initial time to target time. The planner may be executed to determine, based on a destination, locations along a route to the destination that the balloons can travel.

The backward planner is provided as one example mechanism for establishing possible routes between landmarks during a phase. However, other mechanisms that can determine, for a particular staring location/time and an ending location/time, how close to the ending location a balloon can get in the time period allotted, based on predicted wind velocities at one or more altitudes may also be utilized.

In one example, if the sequence of coverage requirements is treated as strict requirements, the problem of determining trajectories for the fleet may be considered a constraint satisfaction problem, where optimization means solving the constraint graph subject to the constraint that each goal is satisfied. If it is allowable to sometimes leave some goals unsatisfied, the problem may be considered an optimization problem: find the configuration that, for example, minimizes the number of unsatisfied goals, or some other measure of the goals' dissatisfaction. Such a problem can be solved using a variety of methods, including as a linear program, as a minimum-cost-flow problem, via gradient descent, via stochastic optimization, or using other existing or future developed methods.

For instance, the problem may be solved as a linear program. In one case, the goal for the linear program is to take a time-varying description of how many balloons are desired at each landmark ("the goal distribution"), the initial location of each balloon, and a summary of which goal landmarks are reachable from which other landmarks at a given time, along with a measure of how accurately a balloon can be expected to reach a goal landmark, and determine a fleet-wide policy that maximizes a likelihood of satisfying the goal distribution. Note that the goal distribution is not concerned with determining where any particular balloon goes, but rather that the correct numbers of balloons are in the correct areas at each phase.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving information indicative of a region divided into a plurality of horizontal bands of latitudes and indicative of a population density for one or more areas of the region;
associating the population density for a given area with a corresponding horizontal band of latitude in which the given area resides;
based on the population density associated with each horizontal band of latitude, determining, by a processor, a distribution of a plurality of balloons per horizontal band of latitude;
determining one or more altitudes for the distribution of the plurality of balloons to travel, per horizontal band of latitude, to remain in a trajectory substantially within a respective horizontal band of latitude; and
based on the determined one or more altitudes, providing, by the processor, instructions to control the distribution of the plurality of balloons per horizontal band of latitude, wherein the instructions cause at least one balloon of the plurality of balloons to remain in the trajectory substantially within the respective horizontal band of latitude.

2. The method of claim 1, further comprising determining the instructions to control the distribution of the plurality of balloons per horizontal band of latitude to remain in the trajectory substantially within the respective horizontal band of latitude based on a self-repeating weather phenomenon of the region.

3. The method of claim 1, further comprising determining an adjustment to the distribution of the plurality of balloons based on a change in the population density of a given area.

4. The method of claim 1, wherein determining the distribution of the plurality of balloons per horizontal band of latitude comprises varying the distribution of the plurality of balloons per horizontal band of latitude.

5. The method of claim 1, wherein given horizontal bands of latitudes have a thickness based on Northern and Southern wind bands present at the latitudes.

6. The method of claim 1, further comprising determining the distribution of the plurality of balloons per horizontal band of latitude based on an amount of data communication access provided for given areas residing in the horizontal band of latitude.

7. The method of claim 1, wherein determining the distribution of the plurality of balloons per horizontal band of latitude comprises determining a given distribution in which the plurality of balloons have a substantially uniform density per a given band of longitude.

8. The method of claim 1, wherein determining the distribution of the plurality of balloons per horizontal band of latitude comprises determining a given distribution in which the plurality of balloons are provided in one or more clusters of balloons based on bands of longitude.

9. The method of claim 1, further comprising dividing the region into the plurality of horizontal bands of latitudes based on the population density for the given area with the corresponding horizontal band of latitude in which the given area resides.

10. The method of claim 1, further comprising:
grouping areas from among the one or more areas of the region that have similar associated population density values;
determining respective areas from the grouped areas that lie within a respective horizontal band of latitude having a thickness within a threshold amount; and
assigning a respective distribution of balloons to operate in the respective horizontal band of latitude.

11. The method of claim 1, further comprising determining one or more horizontal bands of latitudes from among the plurality of horizontal bands of latitudes at which to assign respective distributions of balloons to operate.

12. The method of claim 1, further comprising determining one or more horizontal bands of latitudes from among the plurality of horizontal bands of latitudes at which to avoid assigning respective distributions of balloons to operate.

13. The method of claim 1, wherein the balloon is an element within a data network and comprises one or more components operable to provide data communication via optical or radio-frequency (RF) links.

14. A non-transitory computer readable storage medium having stored therein instructions, that when executed by a computing device, cause the computing device to perform functions comprising:
dividing a region into a plurality of horizontal bands of latitudes;
receiving information indicative of a population density for one or more areas of the region;
associating the population density for a given area with a corresponding horizontal band of latitude in which the given area resides;
based on the population density associated with each horizontal band of latitude, determining a distribution of a plurality of balloons per horizontal band of latitude;
determining one or more altitudes for the distribution of the plurality of balloons to travel, per horizontal band of latitude, to remain in a trajectory substantially within a respective horizontal band of latitude; and
based on the determined one or more altitudes, providing instructions to control the distribution of the plurality of balloons per horizontal band of latitude, wherein the instructions cause at least one balloon of the plurality of balloons to remain in the trajectory substantially within the respective horizontal band of latitude.

15. The computer readable storage medium of claim 14, wherein given horizontal bands of latitudes have a thickness based on Northern and Southern wind bands present at the latitudes, and wherein the functions further comprise:
determining the instructions to control the distribution of the plurality of balloons per horizontal band of latitude to remain in the trajectory substantially within the respective horizontal band of latitude based on a self-repeating weather phenomenon of the region.

16. The computer readable storage medium of claim 14, wherein the functions further comprise:
determining areas from among the one or more areas of the region that have similar associated population density values;
determining respective areas from the areas that lie within a respective horizontal band of latitude having a thickness within a threshold amount; and
assigning a respective distribution of balloons to operate in the respective horizontal band of latitude.

17. A system, comprising:
at least one processor; and
data storage comprising program instructions executable by the at least one processor to cause the at least one processor to perform functions comprising:
receiving information indicative of a region divided into a plurality of horizontal bands of latitudes and indicative of a population density for one or more areas of the region;
associating the population density for a given area with a corresponding horizontal band of latitude in which the given area resides;
based on the population density associated with each horizontal band of latitude, determining a distribution of a plurality of balloons per horizontal band of latitude;
determining one or more altitudes for the distribution of the plurality of balloons to travel, per horizontal band of latitude, to remain in a trajectory substantially within a respective horizontal band of latitude; and
based on the determined one or more altitudes, providing instructions to control the distribution of the plurality of balloons per horizontal band of latitude, wherein the instructions cause at least one balloon of the plurality of balloons to remain in the trajectory substantially within the respective horizontal band of latitude.

18. The system of claim 17, wherein the balloon is an element within a data network and comprises one or more components operable to provide data communication via optical or radio-frequency (RF) links.

19. The system of claim 17, wherein the functions further comprise determining one or more horizontal bands of latitudes from among the plurality of horizontal bands of latitudes at which to assign respective distributions of balloons to operate by:
determining areas from among the one or more areas of the region that have similar associated population density values;
determining respective areas from the areas that lie within a respective horizontal band of latitude having a thickness within a threshold amount; and
assigning a respective distribution of balloons to operate in the respective horizontal band of latitude.

* * * * *